United States Patent
Saha et al.

(10) Patent No.: US 7,529,188 B2
(45) Date of Patent: May 5, 2009

(54) LOAD EQUALIZATION METHOD FOR NEW CONNECTIONS IN A WIRELESS ENVIRONMENT SUPPORTING SHARED ACCESS FOR MULTIPLE TERMINALS IN A QOS CONTROLLED MANNER

(76) Inventors: Abheek Saha, Nirlac Center, 2nd Floor, B - 25, Qutab Institutional Area, New Delhi (IN) 110 067; Prabir Datta, Nirlac Center, 2nd Floor, B - 25, Qutab Institutional Area, New Delhi (IN) 110 067

( * ) Notice: Subject to any disclaimer, the term of this patent is extended or adjusted under 35 U.S.C. 154(b) by 524 days.

(21) Appl. No.: 11/165,534

(22) Filed: Jun. 24, 2005

(65) Prior Publication Data

US 2007/0014238 A1   Jan. 18, 2007

(51) Int. Cl.
*H04J 3/14* (2006.01)
(52) U.S. Cl. .................................. 370/230.1; 229/230
(58) Field of Classification Search .............. 370/229, 370/230, 230.1
See application file for complete search history.

(56) References Cited

U.S. PATENT DOCUMENTS

| | | | | |
|---|---|---|---|---|
| 6,590,865 | B1 * | 7/2003 | Ibaraki et al. | 370/230 |
| 2003/0081626 | A1 * | 5/2003 | Naor et al. | 370/431 |
| 2003/0103450 | A1 * | 6/2003 | CHAPMAN et al. | 370/229 |
| 2004/0032828 | A1 * | 2/2004 | Satt et al. | 370/230 |
| 2006/0148483 | A1 * | 7/2006 | Howard et al. | 455/450 |

* cited by examiner

*Primary Examiner*—Derrick W Ferris
*Assistant Examiner*—Omar Ghowrwal
(74) *Attorney, Agent, or Firm*—Nixon & Vanderhye PC

(57) ABSTRACT

Load is smoothed over multiple bearers in a given spot-beam for a TDMA wireless personal communication system, offering packet data communication services to individual user terminals in shared mode. Load can be smoothed over multiple bearers in a given spot-beam for a TDMA wireless personal communication system which allows maintenance of minimum service levels as a guarantee to individual connections as well as optimizing distribution of users to all available radio channels. It is possible to distinguish between whether a particular bearer is QoS-blocked or demand-blocked. Either a loose smoothing algorithm or a tight smoothing algorithm may be used for the load control operation based on the above dispensation.

10 Claims, 1 Drawing Sheet

LOAD EQUALIZATION METHOD FOR NEW CONNECTIONS IN A WIRELESS ENVIRONMENT SUPPORTING SHARED ACCESS FOR MULTIPLE TERMINALS IN A QOS CONTROLLED MANNER

SUMMARY

The present invention relates to a method of smoothing load over multiple bearers in a given spot-beam for a TDMA wireless personal communication system, offering packet data communication services to individual user terminals in shared mode. The present invention also relates to a method for the smoothing of load over multiple bearers in a given spot-beam for a TDMA wireless personal communication system which allows maintenance of minimum service levels as a guarantee to individual connections as well as optimizing distribution of users to all available radio channels. The method of the invention is also enabled to distinguish between whether a particular bearer is QoS-blocked or demand-blocked. The method of the invention uses either a loose smoothing algorithm or a tight smoothing algorithm for the load control operation based on the above dispensation.

DETAILED DESCRIPTION OF EXEMPLARY EMBODIMENTS

Figure 1:
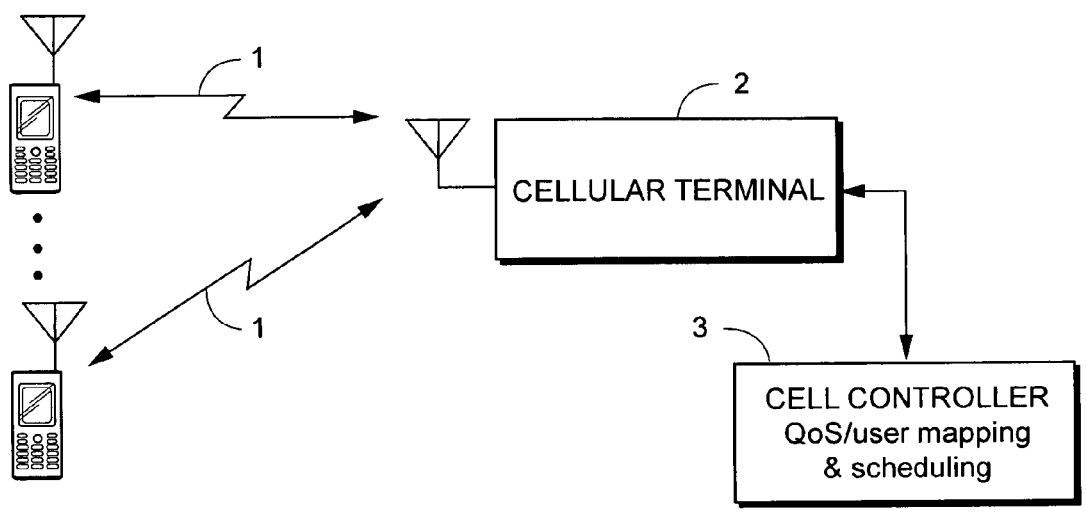
FIG. 1 depicts an exemplary embodiment of this invention.

The algorithm used in the method of the invention has the following operating environment and implementation:
 The method is concerned with re-deploying connections over available in-use radio channels (e.g., see RF connection channels 1 in FIG. 1) in the single cell 2 of a given cellular environment, thus offering balanced performance on all radio-channels 1. The redeployment is considered a relatively inexpensive procedure and is carried out by sending a message to the terminal 2 to retune its receivers to a new radio-channel.
 Each user can be mapped (e.g., at cell controller 3) to a given QoS level, which is known to the algorithm. The QoS level can be mapped to the minimum amount of bandwidth that has to be given to the user, when the user has data to send, for the QoS guarantee to be met. The definition of QoS is such that, if the actual bandwidth offered to the user is greater than the minimum level (measured on a frame by frame basis), the actual QoS seen by the user is better than the guaranteed QoS level.
 The existence of a scheduling algorithm is assumed, which decides on the fine-grained allocation of radio-resources to individual connections. The scheduling algorithm operates on the same QoS levels as described above.
 For each user, a measured demand and an anticipated demand is assumed. The measured demand is the actual requirement for resources for that user, and the anticipated demand is computed as $I_g$ $T_g$=total service requested in current backlog period in bytes;
$D_g$=duration of current backlog period;
$I_g=T_g/D_g$;
if ($I_g$>offered b/w)
 addl. Pot. Demand=$I_g$−offered b/w;
else addl. Potential demand=0,
 The method calls for the computation of surplus capacity for each radio channel. The surplus capacity is the bandwidth available after all connections have been serviced at the minimal QoS level
 The method calls for the computation of the total potential demand for each active user terminal in the cell.
 The method calls for the computation of the offered bandwidth for each terminal by measuring the average bandwidth given to the terminal during its latest backlog period.
 The method calls for the computation of the total deficit demand for each user terminal by computing the difference between the total demand and the offered bandwidth. The total deficit bandwidth for a given radio-channel is measured by summing the deficit bandwidths for all terminals using that radio-channel.
For the entire cell, we compute the total deficit demand and the total surplus capacity. If the total deficit demand is greater than the total surplus capacity, we execute the tight smoothing algorithm as follows;
 for each bearer, the ratio between the total estimated deficit of all the mobile terminals using that bearer and the surplus on that bearer is computed. This ratio is called the bearer adequacy ratio (BAR).
 For the entire spot-beam, there is a configured threshold adequacy ratio.
 all the bearers whose current adequacy ratio is less than the threshold in increasing order of BAR are listed. This is the list of bearers which have additional capacity available, it is called the T-table
 all the bearers whose current adequacy ratio is greater than the threshold in decreasing order of BAR is listed. This is the list of bearers which need to create additional capacity, and is called the D-table.
 a pair comprising of one member from the T-table and one from the D-table as described above are identified. The pair of bearers are chosen such that there is one connection in the bearer from the D-table, which may be returned to the bearer in the T-table. The conditions for this to happen will include (a) whether the absolute utilization of the connection is less than the absolute surplus in the first bearer (b) application specific or system specific conditions.
 To find the optimal pair, the first entries from the D-list and T-list are taken to see if a pair can be formed. If the $1^{st}$ member from either or both lists is not acceptable, the method continues down the to the second entry and so forth.
 A retune of the chosen connection from the $2^{nd}$ member of the pair to the $1^{st}$ member in the pair is executed. This pair is then marked as ineligible for further transfers in this cycle and the method continues on with the rest of the members in the list.
If the cell is in 'tight smoothing', the higher layer resource manager is informed that further resources are required in this cell. It is up to the higher layer resource manager as to whether it allots fresh resources, or whether it imposes congestion control features in this cell.
For the entire cell, the total deficit demand and the total surplus capacity is computed. If the total deficit demand is less than the total surplus capacity, the loose smoothing algorithm is executed as follows.
 In the entire cell, the User connections which have deficit demand are listed in increasing order of deficit, the U-list
 In the entire cell, the bearers in surplus capacity are listed in increasing order of surplus, the B-list.
 the first entry in the U-list of connections are taken and the $1^{st}$ entry in the bearer see whether (a) the surplus on its current bearer is less than the surplus on the selected bearer and (b) it can be returned to the selected bearer. If so, a retune is done and the bearer struck off the B-list, as well as the connection off the U-list. If not, the method continues to search in the B-list to find a suitable bearer. This is repeated for all entries in the U-list.

The above description should not be construed as limiting in any manner. Work is still underway in completing the invention. It will be evident that modifications and variations are possible without departing from the scope and spirit of the invention.

What is claimed is:

1. A method of smoothing load over multiple bearers in a given spot-beam for a TDMA wireless personal communication system, offering packet data communication services to individual user terminals in shared mode, the method comprising:
    (a) re-deploying connections over available in-use radio channels in the single cell of a given cellular environment, thus offering balanced performance on all radio-channels, the re-deployment being effected by sending a message to each terminal to retune its receivers to a new radio-channel;
    (b) mapping each user to a given known QoS level;
    (c) providing a scheduling process which decides on fine-grained allocation of radio-resources to individual connections;
    (d) providing a measured demand and an anticipated demand for each user;
    (e) computing a surplus capacity for each radio channel, the surplus capacity being the bandwidth available after all connections have been serviced at the minimal QoS level;
    (f) computing total potential demand for each active user terminal in the cell;
    (g) computing offered bandwidth for each terminal by measuring the average bandwidth given to the terminal during its latest backlog period;
    (h) computing total deficit demand for each user terminal by computing the difference between the total potential demand and the offered bandwidth;
    (i) computing total deficit demand and the total surplus capacity for the whole cell;
    (j) if the total deficit demand is greater than the total surplus capacity, executing a tight smoothing process; or if the total deficit demand is less than the total surplus capacity, executing a loose smoothing process; and
    (k) if the cell is in 'tight smoothing', informing a higher layer resource manager that further resources are required in the cell;
    wherein the tight smoothing process comprises:
    (i) computing for each bearer a bearer adequacy ratio (BAR), the ratio being between the total estimated deficit of all the mobile terminals using that bearer and the surplus on that bearer;
    (ii) maintaining for the entire spot-beam, a configured threshold adequacy ratio;
    (iii) preparing a list (hereinafter called T-table) comprising all the bearers whose current adequacy ratio is less than the threshold in increasing order of BAR are listed;
    (iv) preparing a list (hereinafter termed D-table) comprising all the bearers whose current adequacy ratio is greater than the threshold in decreasing order of BAR is listed, the bearers being bearers who need to create additional capacity;
    (v) identifying a pair comprising of one member from the T-table and one from the D-table, the pair of bearers being chosen such that there is one connection in the bearer from the D-table, which is retunable to the bearer in the T-table;
    (vi) finding an optimal pair by taking a first entry from the D-table and T-table and if the first member from either or both tables is not acceptable, continuing down the lists to the second entry until the lists are completed;
    (vii) executing a retune of the chosen connection from the second member of the pair to the first member in the pair and marking the pair as ineligible for further transfers in this cycle and continuing the preceding steps with other members in the list; and
    (viii) informing the higher layer resource manager if the cell is in 'tight smoothing', that further resources are required in this cell.

2. A method as claimed in claim 1 wherein a QoS level is mapped to the minimum amount of bandwidth that has to be given to a user, when the user has data to send, for the QoS guarantee to be met.

3. A method as claimed in claim 1 wherein a QoS is defined such that if actual bandwidth offered to the user is greater than a minimum level measured on a frame by frame basis, the actual QoS seen by the user is better than the guaranteed QoS level.

4. A method as claimed in claim 1 wherein the scheduling process operates on the same QoS levels as the operating process.

5. A method as claimed in claim 1 wherein the measured demand is the actual requirement for resources for that user, and the anticipated demand is computed.

6. A method as claimed in claim 5 wherein the total service requested in the current backlog period in bytes is $T_g$, and wherein $D_g$=duration of current backlog period and wherein anticipated demand=$T_g/D_g$ if anticipated demand>offered bandwidth) and wherein additional potential demand=anticipated demand−offered bandwidth, else additional potential demand=0.

7. A method as claimed in claim 1 wherein a total deficit bandwidth for a given radio-channel is measured by summing the deficit bandwidths for all terminals using that radio-channel.

8. A method as claimed in claim 1 wherein the higher layer resource manager determines whether fresh resources should be allotted or whether congestion control features should be imposed in this cell.

9. A method as claimed in claim 1 wherein the loose smoothing process is executed by:
    (a) listing in the entire cell, the user connections which have deficit demand in increasing order of deficit (hereinafter called the U-list);
    (b) listing in the entire cell, the bearers in surplus capacity in increasing order of surplus, (hereinafter termed as the B-list); and
    (c) taking the first entry in the U-List of connections and the first entry in the bearer and seeing whether (i) the surplus on its current bearer is less than the surplus on the selected bearer and (ii) if the surplus on its current bearer can be retuned to the selected bearer, and then retuning being carried out and the bearer is struck off the B-list, as well as the connection off the U-list, and if not, the method continuing to search in the B-list to find a suitable bearer, this step being repeated for all entries in the U-list.

10. A method as claimed in claim 9 wherein execution of the tight smoothing process is dependent upon (i) whether the absolute utilization of the connection is less than the absolute surplus in the first bearer (ii) application specific or system specific conditions.

* * * * *